US012763264B2

(12) United States Patent
Takeshita et al.

(10) Patent No.: US 12,763,264 B2
(45) Date of Patent: Oct. 13, 2026

(54) SOLID ELECTROLYTIC CAPACITOR ELEMENT AND SOLID ELECTROLYTIC CAPACITOR

(71) Applicant: Panasonic Intellectual Property Management Co., Ltd., Kadoma (JP)

(72) Inventors: Masatoshi Takeshita, Osaka Fu (JP); Mayumi Maenishi, Osaka Fu (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 137 days.

(21) Appl. No.: 18/833,094

(22) PCT Filed: Jan. 20, 2023

(86) PCT No.: PCT/JP2023/001712

§ 371 (c)(1),
(2) Date: Jul. 25, 2024

(87) PCT Pub. No.: WO2023/145644

PCT Pub. Date: Aug. 3, 2023

(65) Prior Publication Data

US 2025/0118499 A1 Apr. 10, 2025

(30) Foreign Application Priority Data

Jan. 28, 2022 (JP) ................................ 2022-011870

(51) Int. Cl.
*H01G 9/025* (2006.01)
*H01G 9/045* (2006.01)
(Continued)

(52) U.S. Cl.
CPC ............ *H01G 9/025* (2013.01); *H01G 9/055* (2013.01); *H01G 9/15* (2013.01)

(58) Field of Classification Search
None
See application file for complete search history.

(56) References Cited

U.S. PATENT DOCUMENTS 10,873,076 B2 * 12/2020 Matsumoto ........... H01M 4/587
2013/0059064 A1 * 3/2013 Majima ................ H01G 9/0036
427/80

(Continued)

FOREIGN PATENT DOCUMENTS

JP 2008-053479 A 3/2008
JP 2011029580 A * 2/2011

(Continued)

OTHER PUBLICATIONS

Translation of JP '580 (Year: 2011).*

(Continued)

*Primary Examiner* — Dion R. Ferguson
(74) *Attorney, Agent, or Firm* — WHDA, LLP

(57) ABSTRACT

A solid electrolytic capacitor element included in a solid electrolytic capacitor includes an anode foil that contains element Al and includes a porous part at least in a surface layer of the anode foil, a dielectric layer that covers at least a portion of a surface of the anode foil, and a solid electrolyte that covers at least a portion of the dielectric layer. The solid electrolyte contains element S, and the solid electrolyte has a first part filled in voids in the porous part in the anode foil having the dielectric layer and a second part that protrudes from the main surface of the anode foil having the dielectric layer. In elemental mapping of a cross section of the porous part using an electron probe microanalyzer, the presence ratio of the element S is 0.5% or more when the presence ratio of the element Al is taken as 100%.

14 Claims, 1 Drawing Sheet

(51) Int. Cl.
*H01G 9/055* (2006.01)
*H01G 9/15* (2006.01)

(56) References Cited

U.S. PATENT DOCUMENTS

| | | | | |
|---|---|---|---|---|
| 2018/0005759 | A1* | 1/2018 | Uka | H01G 9/025 |
| 2019/0027742 | A1* | 1/2019 | Matsumoto | H01M 4/366 |
| 2022/0127414 | A1* | 4/2022 | Lin | H01B 1/127 |
| 2022/0130619 | A1* | 4/2022 | Lin | C08G 61/12 |
| 2024/0213523 | A1* | 6/2024 | Yokoyama | H01M 10/052 |
| 2025/0118499 | A1* | 4/2025 | Takeshita | H01G 9/055 |

FOREIGN PATENT DOCUMENTS

| | | | | |
|---|---|---|---|---|
| JP | 2013-058807 | A | 3/2013 | |
| JP | 2018-129437 | A | 8/2018 | |
| JP | 2021-007167 | A | 1/2021 | |
| JP | 2021-134331 | A | 9/2021 | |
| WO | WO-2024203051 | A1 * | 10/2024 | H01G 9/028 |

OTHER PUBLICATIONS

International Search Report dated Mar. 28, 2023, issued in counterpart International Applicaiton No. PCT/JP2023/001712 (5 pages).

* cited by examiner

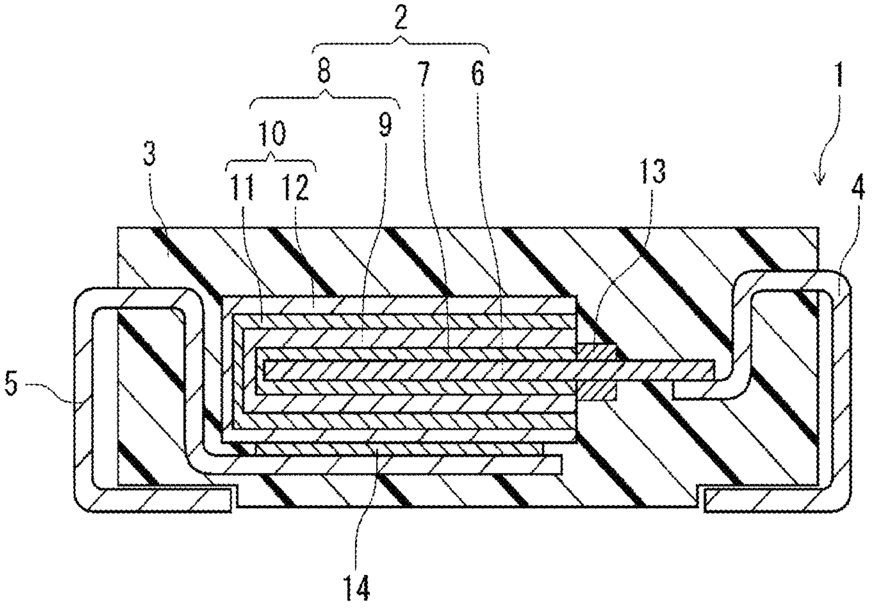
2
8
7
6
1
10
9
3
13
11
12
4
5
14

SOLID ELECTROLYTIC CAPACITOR ELEMENT AND SOLID ELECTROLYTIC CAPACITOR

CROSS REFERENCE TO RELATED APPLICATIONS

This Application is the National Stage of International Application No. PCT/JP2023/001712, filed on Jan. 20, 2023, which claims priority from Application No. 2022-011870 filed on Jan. 28, 2022 in Japan. The entire contents of these applications are incorporated herein by reference in their entirety.

TECHNICAL FIELD

The present disclosure relates to a solid electrolytic capacitor element and a solid electrolytic capacitor.

BACKGROUND ART

A solid electrolytic capacitor includes a solid electrolytic capacitor element, a resin exterior body or a case that seals the solid electrolytic capacitor element, and external electrodes that are electrically connected to the solid electrolytic capacitor element. The solid electrolytic capacitor element includes an anode body, a dielectric layer formed on the surface of the anode body, and a cathode part that covers at least a portion of the dielectric layer, for example. The cathode part contains a conductive polymer (for example, a conjugated polymer and a dopant) that covers at least a portion of the dielectric layer. The conductive polymer is also called a solid electrolyte.

From the viewpoint of easily forming the solid electrolyte, a liquid dispersion containing a conjugated polymer and a dopant is often used for forming the solid electrolyte.

For example, Patent Literature 1 proposes a method for manufacturing an electrolytic capacitor, which includes a step of impregnating an anode body having a dielectric film formed on its surface with a first dispersion solution containing particles of a first conductive polymer and a first solvent, and then impregnating the anode body with a second dispersion solution containing particles of a second conductive polymer and a second solvent, wherein the pH of the first dispersion solution is closer to 7 compared to the pH of the second dispersion solution.

Patent Literature 2 proposes a conductive polymer composite that is made of PEDOT (poly(3,4-ethylenedioxythiophene)) and a polyanion and has a conductive potential α of −0.23 or more, calculated by the following formula (I):

$$\alpha = (I_1/I_2) - 0.135 \times (A_2/A_1) \tag{1}$$

where $I_1$ is the peak intensity at 1260 $cm^{-1}$ and $I_2$ is the peak intensity at 1420 $cm^{-1}$ in the Raman spectrum, and $A_1$ is the absorbance at a wavelength of 950 nm and $A_2$ is the absorbance at a wavelength of 2300 nm in the optical absorption spectrum.

CITATION LIST

Patent Literature

PTL 1: Japanese Laid-Open Patent Publication No. 2013-58807

PTL 2: Japanese Laid-Open Patent Publication No. 2021-134331

SUMMARY OF INVENTION

Technical Problem

From the viewpoint of increasing the surface area and ensuring high capacitance, a porous part having fine voids is formed at least in the surface layer of an anode body such as an anode foil. A liquid dispersion contains a particulate conductive polymer in which a conjugated polymer is composited with a polymer dopant (such as a polymer anion). Therefore, when a solid electrolyte is formed using the dispersion, the particulate conductive polymer is unlikely to be filled to a deep parts of the fine voids, and it is difficult to increase the filling rate of the conductive polymer in the porous part. In this case, the capacitance will significantly decrease when charge and discharge are repeated.

Solution to Problem

A first aspect of the present disclosure relates to a solid electrolytic capacitor element including: an anode foil that contains aluminum element and includes a porous part at least in a surface layer of the anode foil; a dielectric layer that covers at least a portion of a surface of the anode foil; and a solid electrolyte that covers at least a portion of the dielectric layer, wherein the solid electrolyte contains sulfur element, and the solid electrolyte has a first part filled in voids in the porous part in a portion of the anode foil having the dielectric layer and a second part that protrudes from a main surface of the anode foil having the dielectric layer, and in elemental mapping of a cross section of the porous part using an electron probe microanalyzer, a presence ratio of the sulfur element is 0.5% or more when the presence ratio of the aluminum element is taken as 100%.

A second aspect of the present disclosure relates to a solid electrolytic capacitor including at least one solid electrolytic capacitor element described above.

Advantageous Effects of Invention

In a solid electrolytic capacitor, it is possible to suppress a decrease in capacitance caused by repeated charge and discharge.

BRIEF DESCRIPTION OF DRAWING

FIG. 1 is a schematic cross-sectional view of a solid electrolytic capacitor according to an embodiment of the present disclosure.

DESCRIPTION OF EMBODIMENTS

Novel features of the present invention are set forth in the appended claims. The present invention, both in terms of structure and content, will be better understood together with other objects and features of the present invention, from the following detailed description with reference to the drawings.

A method of forming a solid electrolyte using a liquid dispersion is simple and convenient, and has become the mainstream method for forming a solid electrolyte in recent years. On the other hand, in a solid electrolytic capacitor element, the anode foil has a porous part with fine voids formed at least in the surface layer thereof. The dielectric layer is formed along the inner wall surface of depressions (also called pits) on the surface of the anode foil, including the inner wall surfaces of the voids in the porous part. Therefore, fine roughness is formed on the surface of the dielectric layer according to the shape of the surface of the anode foil. The liquid dispersion contains a particulate conductive polymer (such as a conjugated polymer and a dopant) with a relatively high molecular weight. Moreover, in the liquid dispersion, a high-molecular weight polymer anion is preferably used as the dopant from the viewpoint of high affinity for the conjugated polymer and easily securing high stability and high heat resistance.

When a solid electrolyte is formed using a liquid dispersion, a relatively high capacitance can be obtained in the initial stage, but the capacitance decreases significantly as charge and discharge are repeated. This is presumed to be due to the reasons described below. Although the conductive polymer particles contained in the liquid dispersion fill the openings of fine recesses and their surroundings on the surface of the dielectric layer in the porous part, the particles are unlikely to penetrate into the deep parts, making it difficult to increase the filling rate of the conductive polymer. If the filling rate of the conductive polymer in the porous part is low, the voids tend to become air channels. As charge and discharge are repeated, the conjugated polymer may become oxidized and deteriorate by the action of moisture or oxygen contained in the air, or the conjugated polymer may be dedoped due to decomposition of the dopant or the like, so that the conductive polymer deteriorates and decreases in the conductivity. In addition, since the dopant is adsorbed to the conjugated polymer during charge and the dopant is desorbed from the conjugated polymer during discharge, the conductive polymer repeatedly changes in volume due to the adsorption and desorption of the dopant by repeated charge and discharge. The movement of the first part held in the voids is restricted by the metal skeleton of the porous part, whereas the second part easily moves in response to the volume change caused by repeated charge and discharge, and distortion is likely to occur between the first part and the second part. The occurrence of such distortion causes cracks between the surface of the first part or the porous part and the second part, reducing the number of contact points. This is thought to increase the resistance between the first part or the porous part and the second part. Accordingly, when charge and discharge are repeated, it becomes difficult to obtain sufficient capacitance, and thus the capacitance is thought to decrease.

As a technique used prior to liquid dispersion, there is also a method of forming a solid electrolyte by using in-situ polymerization such as chemical polymerization. In in-situ polymerization, however, it is difficult to control the polymerization reaction, and generally it is difficult to obtain a uniform solid electrolyte, and the types of raw monomers of the conjugated polymer and dopants that can be used are limited. In fact, in in-situ polymerization, a pyrrole compound is often adopted, and a low-molecular weight compound such as an aromatic sulfonic acid is used as a dopant. Therefore, the dopant and the conductive polymer are low in stability, and dedoping or deterioration of the conductive polymer is likely to occur, and the capacitance tends to decrease when charge and discharge are repeated.

In view of this, (1) a solid electrolytic capacitor element according to the present disclosure includes: an anode foil that contains aluminum element and includes a porous part at least in a surface layer of the anode foil; a dielectric layer that covers at least a portion of a surface of the anode foil; and a solid electrolyte that covers at least a portion of the dielectric layer. The solid electrolyte contains sulfur element, and the solid electrolyte has a first part filled in voids in the porous part in a portion of the anode foil having the dielectric layer and a second part that protrudes from a main surface of the anode foil having the dielectric layer. In elemental mapping of a cross section of the porous part using an electron probe microanalyzer, the presence ratio of the sulfur element is 0.5% or more when the presence ratio of the aluminum element is taken as 100%.

(2) In the above (1), the first part may contain a first polymer component corresponding to a conjugated polymer and a second polymer component corresponding to a polymer anion containing the sulfur element.

(3) In the above (2), the first polymer component may contain the sulfur element.

(4) In the above (2) or (3), in a Raman spectrum of the first part, a ratio $I_{p1}/I_{p2}$ of an intensity $I_{p1}$ of a first peak specific to the first polymer component to an intensity $I_{p2}$ of a second peak specific to the second polymer component is 2 or more.

(5) In the above (4), the ratio $I_{p1}/I_{p2}$ may be 7 or less.

(6) In any one of the above (2) to (5), in the first part, the conjugated polymer may contain a monomer unit corresponding to a thiophene compound. The polymer anion may contain a monomer unit corresponding to an aromatic sulfonic acid compound. In a Raman spectrum of the first part, a first peak specific to the first polymer component may be observed in the range of 1200 $cm^{-1}$ or more and 1600 $cm^{-1}$ or less. A second peak specific to the second polymer component may be observed in the range of 800 $cm^{-1}$ or more and 1100 $cm^{-1}$ or less.

(7) In any one of the above (2) to (6), the weight average molecular weight of the polymer anion may be 100 or more and 500,000 or less.

(8) A solid electrolytic capacitor according to the present disclosure includes at least one solid electrolytic capacitor element according to any one of the above (1) to (7).

(9) In the above (8), the solid electrolytic capacitor may include a plurality of the solid electrolytic capacitor elements stacked together.

In the solid electrolytic capacitor element and the solid electrolytic capacitor of the present disclosure, the solid electrolyte contains the sulfur element (element S), and has the first part filled in the voids in the porous part (such as the above-described recesses) in the anode foil with the dielectric layer and the second part that protrudes from the main surface of the anode foil with the dielectric layer. The anode foil contains the aluminum element (element Al). In element mapping of the cross section of the porous part using an electron probe microanalyzer, the presence ratio of the element S is 0.5% or more when the presence ratio of Al element is taken as 100%. Hereinafter, the solid electrolytic capacitor element may be simply referred to as a capacitor element.

In the present disclosure, since the presence ratio of the element S is relatively large at 0.5% or more relative to the presence ratio of the element Al in the porous part, it is possible to suppress a decrease in the capacitance due to repeated charge and discharge. The element S is mainly derived from the conjugated polymer and dopant that constitute the solid electrolyte. For example, a polythiophene-based conjugated polymer contains the element S of a thiophene ring, and the dopant contains the element S derived from an anionic group such as a sulfo group. On the other hand, the anode foil containing the element Al is mainly constituted of Al or an Al alloy, and the dielectric layer is constituted of an Al oxide. Therefore, the relative increase in the presence ratio of the element S relative to the presence ratio of the element Al in the porous part means that the ratio of the solid electrolyte contained in the porous part is relatively large (in other words, the filling rate of the solid electrolyte in the voids of the porous part is high). In the present disclosure, it is thought that the relatively high filling rate of the solid electrolyte can be obtained due to the presence ratio of the element S in the porous part being within the above range, and that the resultant decrease in air flow paths hinders the progress of deterioration of the solid electrolyte. In addition, since the voids in the porous part are highly filled with the solid electrolyte, it is thought that even if the volume of the solid electrolyte changes repeatedly due to repeated charge and discharge, a relatively large number of contact points are maintained between the first part or the porous part and the second part. Therefore, it is thought that a relatively high capacitance can be maintained even if charge and discharge are repeated.

The above-described relatively high content of the element S in the porous part can be obtained by, for example, forming a dielectric layer at the surface of an anode foil that contains the element Al and includes a porous part at least in the surface layer, immersing the obtained anode foil having the dielectric layer at the surface in a polymerization solution containing a precursor of a conjugated polymer and a polymer anion containing the element S, and conducting electrolytic polymerization by a three-electrode method at a relatively low polymerization potential. It is thought that when electrolytic polymerization is performed under specific conditions as mentioned above, in the presence of the polymer anion that is relatively stable as a dopant, the polymerization of the precursor of the conjugated polymer gradually progresses, and a conductive polymer in which the conjugated polymer and the polymer anion have interacted with each other is generated, thereby forming a dense solid electrolyte. Since the precursor and the polymer anion are in a state of being dissolved in the polymerization solution, they easily penetrate deep into the fine voids of the porous part. Therefore, the polymerization easily progresses not only near the openings of the voids but also in the deep parts of the voids. It is thus thought that a high filling rate of the solid electrolyte in the voids can be obtained. In the voids of the porous part, the polymerization of the precursor of the conjugated polymer progresses while interacting with the polymer anion, so that a high orientation of the formed conjugated polymer can be easily obtained, the polymer anion can be relatively uniformly dispersed, and a relatively high doping rate can be easily obtained. Therefore, the solid electrolyte in the first part has high conductivity, and even if charge and discharge are repeated, dedoping or deterioration of the conjugated polymer is unlikely to occur. In addition, since the filling rate of the solid electrolyte in the porous part is high, even if the volume of the solid electrolyte repeatedly changes due to repeated charge and discharge, the contact points between the first part or the porous part and the second part are maintained. Therefore, it is thought that the above-described excellent effects can be obtained.

In addition, even when the first part is formed using a liquid dispersion that contains a conjugated polymer containing the element S such as PEDOT and a polymer anion containing the element S such as polystyrene sulfonic acid (PSS), the presence ratio of the element S in the porous part is low, for example, less than 0.5%. This is thought to be because, as described above, when a liquid dispersion is used, the filling rate of the solid electrolyte in the porous part is low.

The three-electrode electrolytic polymerization is performed using three electrodes, namely an anode foil with a dielectric layer formed at the surface, a counter electrode, and a reference electrode. In the three-electrode electrolytic polymerization, the reference electrode is used to precisely control the potential of the anode without being affected by changes in the natural potential of the counter electrode. In the three-electrode electrolytic polymerization, the electrolytic polymerization reaction is more precisely controlled than in the two-electrode electrolytic polymerization using an anode foil and a counter electrode. In addition, it is thought that polymer chains grow slowly while interacting with the polymer anion because the polymerization potential is within a predetermined range. Therefore, it is thought that the orientation of the formed conjugated polymer is increased, the dispersibility of the polymer anion is increased, so that a more uniform and denser solid electrolyte is formed in the voids of the porous part at a high filling rate. In addition, it is thought that the high dispersion of the polymer anion makes it easier to obtain a relatively high doping rate, and makes it easier to increase the conductivity of the solid electrolyte itself.

The presence ratio of the element S in the porous part is 0.5% or more (for example, 0.50% or more), and may be 0.65% or more, or may be 0.7% or more (for example, 0.70% or more). When the presence ratio of the element S is within such a range, the porous part is highly filled with the highly conductive solid electrolyte, so that it is possible to suppress the deterioration of the solid electrolyte when charge and discharge are repeated, maintain the contact points between the first part or the porous part and the second part, and suppress the decrease in the capacitance. In addition, it is possible to keep the resistance of the first part low from the initial stage, keep the initial equivalent series resistance (ESR) low, and secure a relatively high initial capacitance. Considering the volume of the voids in the porous part, the presence ratio of the element S is 5% or less, for example.

The analysis by an electron probe micro analyzer (EPMA) is performed using a sample obtained by exposing a cross section of the porous part in a portion of the capacitor element in which a cathode part including the solid electrolyte is formed, and forming a platinum film thereon. In the cross-sectional image of the porous part with the solid electrolyte, element mapping is performed based on differences in the wavelength of characteristic X-rays from the EPMA in a region that extends from the main surface of the anode foil to the bottom of the porous part and has a width of 5 μm (in other words, a region of the entire thickness of the porous part on one side of the anode foil×a width of 5 μm), and the net strengths of the contained elements are measured. The net strength takes a value obtained by removing the background (noise) from the actual measurement value of each element. The ratio (%) of the net strength of the element S is determined when the net strength of the element Al is taken as 100%. The ratio (%) of the net strength of the element S is determined in a plurality of regions (for example, five regions), and the average value is calculated to obtain the presence ratio (%) of the element S when the presence ratio of the element Al in the porous part is taken as 100%.

The conditions for the EPMA analysis are as follows:

Measurement environment: 25° C. under atmospheric pressure

Acceleration voltage: 15.0 kV
Beam current: 20.1 nA
Integration time: 180.0 ms/point (12 min mode)
Dispersive crystals: AP/CH1, PbST/CH2, PET/CH3, LiF/CH4, LSA80/CH5

The analytical sample can be prepared by the following procedure, for example. First, the solid electrolytic capacitor is embedded in a curable resin and the curable resin is allowed to cure. The anode foil has a first end and a second end opposite to the first end, and the solid electrolyte is formed at the second end of the anode foil. At a predetermined position in the direction from the first end to the second end of the anode foil (in other words, in the length direction of the anode foil or the capacitor element), the cured product obtained as above is wet-polished or dry-polished so as to expose a cross section perpendicular to the length direction and parallel to the thickness direction of the capacitor element. The exposed cross section is smoothed by ion milling. A platinum (Pt) film with a thickness of 1 nm to 2 nm is formed on the smoothed cross section by sputtering platinum using a sputtering device. In this manner, the analytical sample can be obtained. The cross section is located at a position 0 to 0.05 from the second end of the region where the solid electrolyte is formed, when the length of the region where the solid electrolyte is formed in the direction parallel to the length direction of the capacitor element is taken as 1.

Hereinafter, the capacitor element and solid electrolytic capacitor of the present disclosure will be described in more detail, including the above (1) to (9), with reference to the drawings as necessary. At least one of the above (1) to (9) may be combined with at least one of the elements described below, provided that there is no technical contradiction.

[Capacitor Element]

(Anode Foil)

The anode foil included in the capacitor element contains the element Al. The Al functions as a valve metal. The anode foil may contain an Al metal, an Al alloy, or both.

The anode foil has a porous part at least on the surface layer. The porous part includes many fine voids. The porous part increases the surface area of the anode foil, resulting in a high capacitance. The porous part can be formed by roughening the surface of the metal foil containing the element Al, for example. The anode foil may have a core part and a porous part that is formed on both surfaces of the core part and is continuous with the core part, for example. The porous part is the outer part of the roughened metal foil, and the remaining part that is the inner part of the metal foil is the core part. The porous part may be formed at a portion of the surface layer of the anode foil or may be formed at the entire surface layer.

The roughening can be performed by an etching process or the like. The etching process can be performed by electrolytic etching or chemical etching. For example, in electrolytic etching, the thickness of the porous part, the shape and size of the voids, and the like can be adjusted by etching conditions (the number of steps and time of the etching process, the current density, the composition and temperature of the etching solution, and the like).

The thickness of the porous part may be selected as appropriate depending on the use application of the solid electrolytic capacitor, the required performance, and the like. The thickness of the porous part may be $1/10$ or more and $4/10$ or less of the thickness of the anode foil or may be $2/10$ or more and $4/10$ or less of the thickness of the anode foil, per side of the anode foil, for example. The thickness of the porous part is determined by obtaining an image of a cross section of the porous part of the anode foil captured by a scanning electron microscope (SEM) in the thickness direction and calculating the average value of thicknesses at any 10 points in the image.

The cathode part is formed via a dielectric at a part of the anode foil on the second end side. The part of the anode foil on the second end side on which the cathode part is formed is also called a cathode forming part. The anode foil has a porous part at least at the surface layer of the cathode forming part, for example. The part of the anode foil on the first end side on which the cathode part is not formed is also called an anode extraction part. An anode lead terminal may be connected to the anode extraction part.

(Dielectric Layer)

The dielectric layer is formed so as to cover at least a portion of the surface of the anode foil. The dielectric layer is an insulating layer that functions as a dielectric. The dielectric layer is formed by anode-oxidizing Al in the surface of the anode foil through chemical conversion treatment or the like. The surface of the dielectric layer formed on the surface of the anode foil having the porous part has fine roughness according to the shape of the surface of the porous part.

The dielectric layer may be formed of a material that functions as a dielectric layer. Examples of such a material for the dielectric layer include oxides of valve metals. Since the anode foil contains the element Al, the dielectric layer formed by chemical conversion usually contains $Al_2O_3$. However, the dielectric layer is not limited to these specific examples.

(Cathode Part)

The cathode part includes at least a solid electrolyte that covers at least a portion of the dielectric layer. The solid electrolyte is formed on the part of the anode foil on the second end side with a dielectric layer in between. The cathode part usually includes a solid electrolyte that covers at least a portion of the dielectric layer and a cathode extraction layer that covers at least a portion of the solid electrolyte. The solid electrolyte and the cathode extraction layer will be described below.

(Solid Electrolyte)

In the present disclosure, the solid electrolyte includes the element S. The solid electrolyte has, in the anode foil having the dielectric layer, the first part filled in the voids in the porous part and the second part that protrudes from the main surface of the anode foil having the dielectric layer.

The solid electrolyte is constituted of a conductive polymer. The conductive polymer contains a conjugated polymer and a dopant. The solid electrolyte may further contain an additive as necessary. The element S included in the solid electrolyte is mainly derived from the conductive polymer. More specifically, the element S is contained in at least the dopant, and may be contained in both the dopant and the conjugated polymer. The element S is contained at least in the first part, and is usually contained both in the first part and the second part.

(First Part)

The solid electrolyte of at least the first part is formed by three-electrode electrolytic polymerization as described above. The first part may contain a first polymer component that corresponds to a conjugated polymer and a second polymer component that corresponds to a polymer anion containing the element S.

The conjugated polymer corresponding to the first polymer component may be a known conjugated polymer used in a solid electrolytic capacitor, for example, a π-conjugated polymer. Examples of the conjugated polymer include a polymer having a basic skeleton of polypyrrole, polythiophene, polyaniline, polyfuran, polyacetylene, polyphenylene, polyphenylenevinylene, polyacene, and polythiophenevinylene. The above polymers may contain at least one monomer unit constituting the basic skeleton. The monomer unit may also include a monomer unit having a substituent. The above polymers may also include a homopolymer and a copolymer of two or more monomers. For example, polythiophene may include PEDOT (poly(3,4-ethylenedioxythiophene)) and the like.

From the viewpoint of easily increasing the presence ratio of the element S, the first polymer component may contain the element S. Such a conjugated polymer constituting the first polymer component contains a monomer unit corresponding to a thiophene compound, for example. When a thiophene compound is used as a precursor, the electrolytic polymerization easily progresses even in the presence of a polymer anion containing the element S by adjusting the conditions for the electrolytic polymerization, which is more advantageous in increasing the presence ratio of the element S. The thiophene compound may be a compound that has a thiophene ring and is capable of forming a repeated structure of the corresponding monomer unit. The thiophene compound can be linked at position 2 and position 5 of the thiophene ring to form a repeated structure of the monomer unit.

The thiophene compound may have a substituent at least at one of positions 3 and 4 of the thiophene ring. The substituent at the position 3 and the substituent at the position 4 may be linked to form a ring condensed to the thiophene ring. Examples of the thiophene compound include thiophenes and alkylenedioxythiophene compounds ($C_{2-4}$ alkylenedioxythiophene compounds such as ethylenedioxythiophene compounds) that may have a substituent at least at one of the positions 3 and 4. The alkylenedioxythiophene compounds also include those that have a substituent in the alkylene group portion.

Preferred examples of the substituent include, but are not limited to, alkyl groups ($C_{1-4}$ alkyl groups such as methyl group and ethyl group), alkoxy groups ($C_{1-4}$ alkoxy groups such as methoxy group and ethoxy group), hydroxy groups, hydroxyalkyl groups (hydroxy $C_{1-4}$ alkyl groups such as hydroxymethyl group), and the like. When the thiophene compound has two or more substituents, the substituents may be the same or different.

A conjugated polymer (such as PEDOT) containing at least a monomer unit corresponding to a 3,4-ethylenedioxythiophene compound (such as 3,4-ethylenedioxythiophene (EDOT)) may be used. The conjugated polymer containing at least a monomer unit corresponding to EDOT may contain only the monomer unit corresponding to EDOT, or may contain, in addition to the monomer unit, a monomer unit corresponding to a thiophene compound other than EDOT.

The weight-average molecular weight (Mw) of the conjugated polymer is not particularly limited, and is 1,000 or more and 1,000,000 or less, for example.

The weight-average molecular weight (Mw) here has a value measured in terms of polystyrene by gel permeation chromatography (GPC). The GPC is usually measured using a polystyrene gel column and water/methanol (volume ratio 8/2) as a mobile phase.

The first part may contain a second polymer component corresponding to a polymer anion containing the element S as a dopant. The polymer anion constituting the second polymer component may be a polymer having a plurality of sulfo groups, for example. Using the second polymer component makes it easy to increase the presence ratio of the element S in the first part. The polymer anion may have other anionic groups (for example, carboxy groups) in addition to the sulfo groups.

In the solid electrolyte, the anionic groups of the dopant (sulfo group, carboxy group, and the like.) may be contained in a free form, an anion form, or a salt form, or may be contained in a form bound to or interacting with the conjugated polymer. In the present specification, all of these forms may be simply referred to as an "anionic group," "sulfo group," "carboxy group," or the like.

The polymer anion having a sulfo group may be a polymer-type polysulfonic acid. Specific examples of polymer anion include polyvinyl sulfonic acid, polystyrene sulfonic acid (including copolymers and substituted products having a substituent), polyallyl sulfonic acid, polyacrylic sulfonic acid, polymethacrylic sulfonic acid, poly(2-acrylamido-2-methylpropane sulfonic acid), polyisoprene sulfonic acid, polyester sulfonic acid (such as aromatic polyester sulfonic acid), and phenol sulfonic acid novolac resin. However, the polymer anion is not limited to these specific examples. The solid electrolyte may contain one type of polymer anion or a combination of two or more types.

The Mw of the polymer anion is 100 or more and 500,000 or less, for example. From the viewpoint of easily filling the voids of the porous part with the conductive polymer, the Mw of the polymer anion constituting at least the first part is preferably 100,000 or less, more preferably 1,000 or more and 100,000 or less, or 10,000 or more and 100,000 or less. In addition, when the Mw of the polymer anion is in such a range, it is easy to obtain higher dispersibility of the polymer anion and a relatively high doping rate in the first part, which is advantageous in ensuring higher conductivity. In addition, it is easy to obtain high stability of the dopant and the conductive polymer.

In the first part, the amount of the dopant contained in the solid electrolyte is 10 parts by mass or more and 1000 parts by mass or less, for example, and may be 20 parts by mass or more and 500 parts by mass or less, relative to 100 parts by mass of the conjugated polymer. From the viewpoint of easily obtaining higher dispersibility of the polymer anion and a relatively high doping rate, the amount of the dopant may be 50 parts by mass or more and 200 parts by mass or less.

(Raman Spectrum)

In the capacitor element of the present disclosure, at least a first peak specific to the first polymer component (conjugated polymer) and a second peak specific to the second polymer component are observed in the Raman spectrum of the first part. The main component of the solid electrolyte is the conjugated polymer, and in the Raman spectrum of the solid electrolyte, the peak (first peak) attributed to the CC stretching vibration derived from the conjugated polymer is the highest and characteristic. In the first part, the solid electrolyte exhibits high crystallinity due to the high orientation of the conjugated polymer. In addition, in the first part, the conjugated polymer is in an energetically stabilized state. Therefore, the first part exhibits a characteristic Raman spectrum in which the above-mentioned first and second peaks are observed.

For example, when, in the first part, the conjugated polymer contains a monomer unit corresponding to a thiophene compound and the polymer anion contains a monomer unit corresponding to an aromatic sulfonic acid compound, a first peak is observed in the range of 1200 $cm^{-1}$ to 1600 $cm^{-1}$, and a second peak is observed in the range of 800 $cm^{-1}$ to 1100 $cm^{-1}$ in the Raman spectrum of the first part. The first peak is attributed to the CC stretching vibration of the thiophene ring in the monomer unit corresponding to the thiophene compound. The second peak is attributed to the CS stretching vibration between the aromatic ring and the element S of the sulfo group in the monomer unit corresponding to the aromatic sulfonic acid compound. For example, when the conjugated polymer contains at least a monomer unit corresponding to EDOT, the position of the first peak is at 1400 $cm^{-1}$ or more and 1450 $cm^{-1}$ or less, or may be at 1410 $cm^{-1}$ or more and 1435 $cm^{-1}$ or less, for example. When the polymer anion contains at least polystyrene sulfonic acid, the position of the second peak is at 900 $cm^{-1}$ or more and 1050 $cm^{-1}$ or less, for example, and may be at 950 $cm^{-1}$ or more and 1050 $cm^{-1}$ or less On the other hand, in the Raman spectrum of the first part of the solid electrolyte formed using the liquid dispersion, characteristic peaks as described above are not observed. This is thought to be because the observation of Raman scattered light is hindered by emission of fluorescence. In the preparation of the liquid dispersion, since the polymerization progresses in the liquid phase, it is thought that the polymer anion with high molecular weight is more likely to segregate on the surface of the obtained particles of conductive polymer than the precursor of the conjugated polymer. When the liquid dispersion is used, the particles of conductive polymer with the polymer anion segregated on the surface fill the porous part, so it is thought that in the Raman spectrum of the first part, characteristic peaks as described above are not observed due to the emission of fluorescence by the segregated polymer anion.

In the capacitor element of the present disclosure, in the Raman spectrum of the first part, the ratio $I_{p1}/I_{p2}$ of the intensity $I_{p1}$ of the first peak specific to the first polymer component (conjugated polymer) to the intensity $I_{p2}$ of the second peak specific to the second polymer component (polymer anion) may be 2 or more, or may be 3 or more or 4 or more. When the ratio $I_{p1}/I_{p2}$ is in such a range, the orientation and crystallinity of the conjugated polymer in the first part are relatively high. Therefore, it is easy to ensure high conductivity of the solid electrolyte in the first part. From the viewpoint of easily ensuring higher crystallinity and conductivity, the ratio $I_{p1}/I_{p2}$ may be 5 or more or 5.5 or more. The ratio $I_{p1}/I_{p2}$ is 10 or less, for example. From the viewpoint of easily ensuring higher conductivity by obtaining a relatively high doping rate, the ratio $I_{p1}/I_{p2}$ is preferably 7 or less. The ratio $I_{p1}/I_{p2}$ is 2 or more and 10 or less (or 7 or less), for example, and may be 4 or more and 10 or less (or 7 or less). In these numerical ranges, the lower limits may be replaced with the above values. The intensity of each peak corresponds to the peak height obtained by subtracting the height of background from the height of each peak.

In the present specification, the Raman spectrum of the solid electrolyte in the first part is measured under the following conditions for the solid electrolyte present in the cross section of the porous part at a predetermined position in the solid electrolytic capacitor element.

Raman spectrometer: RamanFORCE PAV manufactured by NanoPhoton Corp.

Diffraction grating: 600 gr/cm

Measurement wave number range: 0 $cm^{-1}$ to 2500 $cm^{-1}$

Temperature: 25° C.

The irradiation laser light wavelength, laser power density, and exposure time are determined according to the type of the conjugated polymer. For example, when the conjugated polymer is PEDOT, the irradiation laser light wavelength is 784.73 nm, the laser power density is 870 $W/cm^2$, and the exposure time is 60 seconds.

For the measurement of a Raman spectrum, a sample taken by the following procedure can be used. First, the solid electrolytic capacitor is embedded in a curable resin, and the curable resin is cured. The cured product is subjected to grinding or cross-section polishing to expose a cross section perpendicular to the length direction of the capacitor element and parallel to the thickness direction of the capacitor element. When the length of the region where the solid electrolyte is formed in the direction parallel to the length direction of the capacitor element is taken as 1, the cross section is located at a position 0 to 0.05 from the end of the region where the solid electrolyte is formed on the side (the second end side) opposite to the anode extraction part. In this manner, a measurement sample is obtained. In the exposed cross section of the sample, a Raman spectrum is measured for an 8 μm×8 μm region of the solid electrolyte (first part) formed in the pits on the surface of the porous part. The intensities of the first and second peaks are obtained by averaging the measured values for 12 regions of 8 μm×8 μm of the first part formed in the pits of the porous part.

(Method for Forming Solid Electrolyte)

At least the solid electrolyte of the first part can be formed by three-electrode electrolytic polymerization of a precursor of a conjugated polymer in the presence of a dopant on the surface of the dielectric layer. For example, the electrolytic polymerization is performed in a state where the cathode formation part of the anode foil with the dielectric layer formed on its surface is immersed in a liquid composition (polymerization liquid) containing a precursor of a conjugated polymer and a dopant. Adjusting the conditions for electrolytic polymerization makes it possible to highly fill the fine voids in the porous part with the solid electrolyte, thereby increasing the presence ratio of the element S. In addition, it is possible to perform doping with the dopant at a relatively high doping rate, so that the high conductivity of the solid electrolyte can be secured and the conjugated polymer can be energetically stabilized. Therefore, it is possible to suppress the deterioration of the solid electrolyte, maintain high conductivity even when charge and discharge are repeated, and secure high capacitance.

Examples of the precursor of the conjugated polymer include raw material monomers of the conjugated polymer, oligomers and prepolymers in which a plurality of molecular chains of raw material monomers are linked together. One type of precursor may be used, or two or more types of precursors may be used in combination. From the viewpoint of easily obtaining higher orientation of the conjugated polymer, it is preferable to use at least one (particularly, a monomer) selected from the group consisting of monomers and oligomers as the precursor.

The liquid composition usually contains a solvent. Examples of the solvent include water, an organic solvent, or a mixture of water and an organic solvent (such as a water-soluble organic solvent).

If other conductive materials, additives, and the like are to be used, they may be added to the liquid composition.

The liquid composition may contain an oxidizing agent as necessary. The oxidizing agent may be applied to the anode foil before or after the liquid composition is brought into contact with the anode foil on which the dielectric layer is formed. Examples of such an oxidizing agent include compounds capable of generating $Fe^{3+}$ (such as ferric sulfate), persulfates (such as sodium persulfate and ammonium persulfate), and hydrogen peroxide. One type of oxidizing agent may be used alone or two or more types of oxidizing agents may be used in combination.

The three-electrode electrolytic polymerization is carried out in a state where the anode foil, a counter electrode, and a reference electrode are immersed in the liquid composition. The counter electrode may be a Ti electrode, for example, but is not limited to this. The reference electrode is preferably a silver/silver chloride electrode ($Ag/Ag^+$).

In the electrolytic polymerization, the voltage (polymerization voltage) applied to the anode foil is 0.6 V or more and 1.5 V or less, for example. From the viewpoint of easily filling the voids in the porous part with high concentration and easily ensuring the relatively high crystallinity of the solid electrolyte, the polymerization voltage is preferably more than 0.9 V and 1.2 V or less (or 1.1 V or less), and may be 1 V or more (for example, 1.0 V or more) and 1.2 V or less, or may be 1 V or more (for example, 1.0 V or more) and 1.1 V or less. By performing the three-electrode electrolytic polymerization under such a polymerization voltage, the polymerization reaction in the voids can be precisely controlled. Therefore, in the voids, the polymer chains of the conjugated polymer can be grown in a state where the dopant is highly dispersed, and the voids can be highly filled with the solid electrolyte. In addition, since the polymerization can be slowly progressed, it is possible to further increase the orientation and crystallinity of the conjugated polymer, obtain a relatively high doping rate, and easily ensure a relatively high conductivity. The polymerization voltage constitutes the potential of the anode foil relative to the reference electrode (silver/silver chloride electrode ($Ag/Ag^+$)). In the electrolytic polymerization, a power feeder (such as a power feed tape) is electrically connected to the anode extraction part, and a voltage is applied to the anode foil via the power feeder. The potential of the anode foil is the potential of the power feeder electrically connected to the anode foil.

The temperature at which the electrolytic polymerization is performed is 5° C. or higher and 60° C. or lower, for example, and may be 15° C. or higher and 35° C. or lower.

Prior to the electrolytic polymerization, a precoat layer may be formed on the surface of the dielectric layer. The precoat layer contains a conductive material, for example. The precoat layer may be formed using a liquid dispersion containing a conductive polymer (such as a conjugated polymer and a dopant). However, the liquid dispersion used to form the precoat layer has a smaller particle diameter and a lower concentration of the conductive polymer than the liquid dispersion used to form the solid electrolyte constituting the cathode part. For example, the average primary particle diameter of the conductive polymer particles contained in the liquid dispersion for the precoat layer is 100 nm or less, for example, and may be 60 nm or less. The dry solid content concentration of the liquid dispersion is 1.2 mass % or less, for example. In the liquid dispersion used to form the solid electrolyte constituting the cathode part, the average primary particle diameter of the conductive polymer particles is usually 200 nm or more, and the dry solid content concentration is 2 mass % or more. The conjugated polymer of the precoat layer and the conjugated polymer formed by the electrolytic polymerization may be of the same type or different types. The dopant of the precoat layer and the dopant used in the electrolytic polymerization may be the same or different. In the present disclosure, since the first part is formed by the electrolytic polymerization, even if the precoat layer is formed using a liquid dispersion, the polymerization liquid can be sufficiently penetrated into minute voids, and the first part can be formed at a high filling rate.

(Second Part)

The second part may be different from the first part in at least one of the composition and film quality of the solid electrolyte, or may be the same in both the composition and film quality. If the entire solid electrolyte is constituted of a plurality of layers, the first part may be the first layer, and the second part may be the second layer. In this case, the first layer and the second layer may be different in at least one of the composition and film quality, or may be the same in both the composition and film quality. The second part may be constituted of a plurality of layers. At least two of the plurality of layers may be different in at least one of the composition and film quality, or may be the same in both.

The solid electrolyte of the second part may be formed by chemical polymerization, general two-electrode electrolytic polymerization, or using a liquid dispersion. However, from the viewpoints of highly dispersing the dopant throughout the solid electrolyte, easily ensuring high conductivity, and easily suppressing degradation of the solid electrolyte, it is preferable that the second part is also formed by three-electrode electrolytic polymerization.

The conjugated polymer contained in the second part may be selected from the conjugated polymers described above for the first part, for example. The Mw of the conjugated polymer may be selected from the range described above for the first part. As the dopant, at least one selected from the group consisting of the polymer anions and the anions described above for the first part may be used. Examples of the anion include, but are not particularly limited to, sulfate ions, nitrate ions, phosphate ions, borate ions, organic sulfonate ions, and carboxylate ions. Examples of the dopant that generates sulfonate ions include p-toluenesulfonic acid and naphthalenesulfonic acid. From the viewpoint of easily obtaining higher stability, it is preferable to use a polymer anion.

In the second part, the amount of the dopant contained in the solid electrolyte is 10 parts by mass or more and 1,000 parts by mass or less, for example, or may be 20 parts by mass or more and 500 parts by mass or less, or may be 50 parts by mass or more and 200 parts by mass or less, relative to 100 parts by mass of the conjugated polymer.

The second part may be formed using a liquid dispersion (or solution) containing a conjugated polymer and a dopant. When the second part is to be formed by electrolytic polymerization, the second part may be formed in the same manner as described above for the first part. The polymerization voltage of the electrolytic polymerization may be in the range described above for the first part, or may be 0.6 V or more and 1.5 V or less, or may be 0.7 V or more and 1.2 V or less.

(Other Matter)

Each of the first part and the second part may further contain at least one selected from the group consisting of known additives and known conductive materials other than conductive polymers, as necessary. The conductive material may be at least one selected from the group consisting of conductive inorganic materials such as manganese dioxide, and TCNQ complex salts, for example.

The additive may be a known additive added to solid electrolytes (for example, coupling agent or silane compound), a known conductive material other than conductive polymers, or a water-soluble polymer. The first part and the second part (or each constituent layer thereof) may each contain one of these additives, or may contain two or more of them in combination. When a part is constituted of a plurality of layers, the additives contained in those layers may be the same or different.

The first part and the second part may each be a single layer or may be constituted of a plurality of layers. When a part is constituted of a plurality of layers, the types, compositions, contents, and the like of the conductive polymer, additives, and the like contained in these layers may be the same or different. A layer for enhancing adhesion may be interposed between the dielectric layer and the solid electrolyte.

(Cathode Extraction Layer)

The cathode extraction layer includes at least a first layer that is in contact with the solid electrolyte and covers at least a portion of the solid electrolyte, and may include the first layer and a second layer that covers the first layer. Examples of the first layer include a layer containing conductive particles, a metal foil, and the like. Examples of the conductive particles include at least one selected from conductive carbon and metal powder. For example, the cathode extraction layer may be constituted of a layer containing conductive carbon (also referred to as carbon layer) as the first layer and a layer containing metal powder or a metal foil as the second layer. When a metal foil is used as the first layer, the cathode extraction layer may be constituted of this metal foil.

The conductive carbon may be graphite (artificial graphite, natural graphite, or the like), for example.

The layer containing metal powder as the second layer can be formed by laminating a composition containing metal powder to the surface of the first layer, for example. An example of the second layer is a metal paste layer that is formed using a composition containing metal powder such as silver particles and a resin (binder resin). Although a thermoplastic resin can be used as the resin, it is preferable to use a thermosetting resin such as an imide resin or an epoxy resin.

When a metal foil is used as the first layer, the type of metal is not particularly limited. For the metal foil, a valve metal (aluminum, tantalum, niobium, or the like) or an alloy containing a valve metal is preferably used. If necessary, the surface of the metal foil may be roughened. The surface of the metal foil may be provided with a chemical conversion film, or may be provided with a coating film of a metal different from the metal constituting the metal foil (dissimilar metal) or a coating film of a nonmetal. Examples of the dissimilar metal and nonmetal include metals such as titanium and nonmetals such as carbon (conductive carbon and the like).

The coating film of dissimilar metal or nonmetal (for example, conductive carbon) may be the first layer, and the above-described metal foil may be the second layer.

(Separator)

When a metal foil is used for the cathode extraction layer, a separator may be disposed between the metal foil and the anode foil. The separator is not particularly limited, and may be a nonwoven fabric containing fibers of cellulose, polyethylene terephthalate, vinylon, or polyamide (for example, aliphatic polyamide or aromatic polyamide such as aramid), for example.

(Other Matter)

The solid electrolytic capacitor includes at least one capacitor element. The solid electrolytic capacitor may be a wound type, or may be either a chip type or a stacked type. For example, the solid electrolytic capacitor may include two or more stacked capacitor elements. The solid electrolytic capacitor may also include two or more wound-type capacitor elements. The configuration of the capacitor element may be selected depending on the type of the solid electrolytic capacitor.

In the capacitor element, one end of a cathode lead terminal is electrically connected to the cathode extraction layer. A conductive adhesive is applied to the cathode extraction layer, and the cathode lead terminal is bonded to the cathode extraction layer via the conductive adhesive, for example. One end of an anode lead terminal is electrically connected to the anode foil. The other end of the anode lead terminal and the other end of the cathode lead terminal are extracted from the resin exterior body or the case. The other end of each terminal exposed from the resin exterior body or the case is used for solder connection with a substrate on which the solid electrolytic capacitor is to be mounted, or the like.

The capacitor element is sealed with the resin exterior body or the case. For example, the capacitor element and the resin material of the exterior body (for example, uncured thermosetting resin and filler) may be placed in a mold, and the capacitor element may be sealed with the resin exterior body by transfer molding, compression molding, or the like. At this time, the other end portion of the anode lead terminal connected to the anode lead extracted from the capacitor element and the other end portion of the cathode lead terminal are exposed from the mold. Alternatively, the solid electrolytic capacitor may be formed by placing the capacitor element in a bottomed case such that the other end portions of the anode lead terminal and cathode lead terminal are positioned on the opening side of the bottomed case, and then sealing the opening of the bottomed case with a sealer.

FIG. 1 is a schematic cross-sectional view of a structure of a solid electrolytic capacitor according to an embodiment of the present disclosure. As shown in FIG. 1, the solid electrolytic capacitor 1 includes a capacitor element 2, a resin exterior body 3 that seals the capacitor element 2, and an anode lead terminal 4 and a cathode lead terminal 5 that are at least partially exposed to the outside of the resin exterior body 3. The anode lead terminal 4 and the cathode lead terminal 5 can be made of a metal such as copper or a copper alloy, for example. The resin exterior body 3 has an outer shape of a substantially rectangular parallelepiped, and the solid electrolytic capacitor 1 also has an outer shape of a substantially rectangular parallelepiped.

The capacitor element 2 includes an anode foil 6 made of an Al foil, a dielectric layer 7 that covers the anode foil 6, and a cathode part 8 that covers the dielectric layer 7. The cathode part 8 includes a solid electrolyte layer 9 that covers the dielectric layer 7 and a cathode extraction layer 10 that covers the solid electrolyte layer 9. The anode foil 6 has a porous part that is formed by etching or the like on both surface layers. The solid electrolyte layer 9 contains the element S, and the anode foil 6 with the dielectric layer 7 has a first part filled in the voids in the porous part and a second part that protrudes from the main surface of the anode foil. The presence ratio of the sulfur element is 0.5% or more when the presence ratio of the element Al in the porous part is taken as 100%.

The anode foil 6 includes a region facing the cathode part 8 and a region not facing the cathode part 8. In a part of the region of the anode foil 6 that does not face the cathode part 8 but is adjacent to the cathode part 8, an insulating separation part 13 is formed so as to cover the surface of the anode foil 6 in a strip shape to restrict contact between the cathode part 8 and the anode foil 6. Another part of the region of the anode foil 6 that does not face the cathode part 8 is electrically connected to the anode lead terminal 4 by welding. The cathode lead terminal 5 is electrically connected to the cathode part 8 via an adhesive layer 14 formed of a conductive adhesive.

EXAMPLES

The present invention will be specifically described below based on examples and comparative examples, but the present invention is not limited to the following examples.

<<Solid Electrolytic Capacitors A1 to A3>>

Solid electrolytic capacitors 1 (solid electrolytic capacitors A1 to A3) shown in FIG. 1 were fabricated and their characteristics were evaluated by the procedure described below.

(1) Preparation of Anode Foil 6

Both surfaces of an aluminum foil (thickness: 130 μm) were roughened by etching to prepare the anode foil 6. The thickness of the porous part formed on both surface layers of the anode foil was 50 μm.

(2) Formation of Dielectric Layer 7

The cathode formation part of the anode foil 6 was immersed in a chemical conversion solution, and a direct-current voltage of 70 V was applied to the anode foil 6 for 20 minutes to form the dielectric layer 7 containing aluminum oxide.

(3) Formation of Solid Electrolyte Layer 9

An insulating resist tape was attached between a region of the anode foil 6 with the dielectric layer 7 where the solid electrolyte layer 9 was to be formed and a region of the anode foil 6 where the solid electrolyte layer 9 was not to be formed, thereby forming a separation part 13. The anode foil 6 with the separation part 13 was immersed in a liquid composition containing a conductive material, taken out, and dried to form a precoat layer (not shown).

A 3,4-ethylenedioxythiophene monomer and a polystyrene sulfonic acid (PSS, Mw: 100,000) that was a polymer anion were dissolved in ion-exchanged water to prepare a mixed solution. Iron (III) sulfate (oxidant) dissolved in ion-exchanged water was added to the mixed solution while the mixed solution was stirred to prepare a polymerization solution. The obtained polymerization solution was used to perform three-electrode electrochemical polymerization. More specifically, the anode foil 6 with the precoat layer, a counter electrode, and a reference electrode (silver/silver chloride reference electrode) were immersed in the polymerization solution. A voltage was applied to the anode foil 6 so that the potential of the anode foil 6 (more specifically, the power feeder attached to the anode extraction part) relative to the reference electrode reached the polymerization voltage value shown in Table 1, and electrochemical polymerization was performed at 25° C. to form the solid electrolyte layer 9.

(4) Formation of Cathode Extraction Layer 10

The anode foil 6 obtained in step (3) was immersed in a dispersion liquid in which graphite particles were dispersed in water, and then taken out from the dispersion liquid and dried to form the first layer (carbon layer) 11 at least on the surface of the solid electrolyte layer 9. The drying was performed at 130 to 180° C. for 10 to 30 minutes.

Next, a silver paste containing silver particles and a binder resin (epoxy resin) was applied to the surface of the first layer 11, and the binder resin was cured by heating at 150 to 200° C. for 10 to 60 minutes, thereby forming the second layer (metal paste layer) 12. In this manner, the cathode extraction layer 10 constituted of the first layer (carbon layer) 11 and the second layer (metal paste layer) 12 was formed, and the cathode part 8 constituted of the solid electrolyte layer 9 and the cathode extraction layer 10 was formed.

The capacitor element 2 was fabricated in the above-described manner.

(5) Assembly of Solid Electrolytic Capacitor

The cathode part 8 of the capacitor element 2 obtained in step (4) was joined to one end of the cathode lead terminal 5 with the adhesive layer 14 of a conductive adhesive. One end of the anode foil 6 protruding from the capacitor element 2 was joined to one end of the anode lead terminal 4 by laser welding.

Next, the resin exterior body 3 was formed from an insulating resin by molding around the capacitor element 2. At this time, the other end of the anode lead terminal 4 and the other end of the cathode lead terminal 5 were extracted from the resin exterior body 3.

In this manner, the solid electrolytic capacitors 1 (A1 to A3) were completed. In the same manner as above, a total of 20 solid electrolytic capacitors were fabricated.

<<Solid Electrolytic Capacitor B1>>

The solid electrolyte layer 9 was formed by the procedure described below. Regarding aspects other than those described below, a solid electrolytic capacitor was fabricated similarly to the solid electrolytic capacitor A1.

The anode foil 6 having the dielectric layer 7 was immersed in a liquid dispersion containing a conductive polymer, and dried at 120° C. for 10 to 30 minutes. The process of immersion in the liquid dispersion and drying was repeated four more times to form the solid electrolyte layer 9. As the liquid dispersion, an aqueous dispersion liquid (average particle diameter of the conductive polymer in the dispersion liquid: 400 nm to 600 nm) containing a conductive polymer (poly3,4-ethylenedioxythiophene (PEDOT) and polystyrenesulfonic acid (PSS, Mw=160,000)) at a concentration of 2 to 4 mass % was used.

Evaluations

The solid electrolytic capacitors was subjected to the following evaluations.

(a) Presence Ratio of Element S in Porous Part

Using the solid electrolytic capacitors, EPMA analysis was performed on a cross section of the porous part of the anode foil 6 by the procedure described above, and the net intensities of the element Al and the element S were obtained from element mapping. The presence ratio of the element S was obtained from the net intensities of these elements by the procedure described above.

(b) Measurement of Raman Spectrum of Solid Electrolyte

Using the solid electrolytic capacitors, the Raman spectrum of a cross section of the first part of the solid electrolyte was measured by the procedure described above. In the Raman spectrums of the first parts of the solid electrolytic capacitors A1 to A3, a peak (first peak) specific to the 5-membered ring of PEDOT was observed at 1420 $cm^{-1}$, and a peak (second peak) specific to the aromatic ring-S element bond of PSS was observed at 1000 $cm^{-1}$. The intensity $I_{p1}$ of the first peak and the intensity $I_{p2}$ of the second peak were determined, and the ratio $I_{p1}/I_{p2}$ was calculated.

(c) Electrostatic Capacitance

The initial electrostatic capacitances (μF) of the solid electrolytic capacitors were measured at a frequency of 120 Hz using a four-terminal LCR meter in an environment of 20° C. Then, the average value ($C_0$) of the 20 solid electrolytic capacitors was determined.

Next, the solid electrolytic capacitors were repeatedly charged and discharged 5,000 times under the following conditions, and then their electrostatic capacitances were measured in an environment of 20° C. by the same procedure as for the initial electrostatic capacitances, and the average value ($C_1$) of the 20 solid electrolytic capacitors was calculated. The electrostatic capacitance change rate (AC) was determined using the following formula:

$$\text{Electrostatic capacitance change rate: } (C_1-C_0)/C_0\times 100(\%)$$

The electrostatic capacitance change rate had a negative value, and the smaller the value, the more the capacitance decreased after repeated charge and discharge.

(d) ESR

The initial ESRs (mΩ) of the capacitor elements were measured at a frequency of 100 kHz using a four-terminal LCR meter in an environment of 20° C. Then, the average value of initial ESRs of 20 capacitor elements was determined.

Table 1 shows the evaluation results. A1 to A3 are examples, and B1 is a comparative example. The initial capacitance $C_0$ and the initial ESR are shown as relative values when the value of B1 is taken as 100.

TABLE 1

| | | Polymerization potential (V) | Presence ratio of element S (%) | Raman spectrum $Ip_1$ | Raman spectrum $Ip_2$ | Raman spectrum $Ip_1/Ip_2$ | $C_0$ relative value | ΔC (%) | ESR relative value |
|---|---|---|---|---|---|---|---|---|---|
| A1 | Electrolytic polymerization | 1.1 | 0.78 | 3545 | 615 | 5.8 | 111 | −6 | 72 |
| A2 | Electrolytic polymerization | 1.0 | 0.81 | 3444 | 520 | 6.6 | 112 | −3 | 66 |
| A3 | Electrolytic polymerization | 1.2 | 0.77 | 3356 | 817 | 4.1 | 107 | −14 | 78 |
| B1 | Liquid dispersion | — | 0.43 | — | — | — | 100 | −93 | 100 |

As shown in Table 1, in B1 in which the presence ratio of the element S was less than 0.5%, the capacitance significantly decreased after repeated charge and discharge. In fact, in B1, ΔC decreased to about −80% at the point of time when charge and discharge were repeated 2000 times. That is, it can be seen that in B1, the capacitance significantly decreased at a relatively early stage. In contrast, in the examples in which the presence ratio of the element S was 0.5% or more, the change in capacitance after repeated charge and discharge was suppressed to a lower level than in the comparative example in which the presence ratio of the element S was less than 0.5%. In addition, in A1 to A3, a high initial capacitance was obtained and the ESR was suppressed a lower level than in B1. This is thought to be because the porous part was highly filled with the solid electrolyte, resulting in high initial conductivity.

Moreover, in B1, no characteristic peaks were observed in the Raman spectrum of the first part. In view of this, it is thought that in B1, the observation of Raman scattered light was hindered by fluorescence emission. In B1, the porous part was filled with particles of the conductive polymer, and it is thought that PSS was segregated to such an extent that significant fluorescence emission occurred on the surfaces of the particles. In contrast, in A1 to A3, both the first and second peaks were observed in the Raman spectrum of the first part. Since the peaks of PEDOT and PSS were clearly observed, it can be seen that no fluorescence emission occurred in A1 to A3, unlike in B1. That is, in the first parts of A1 to A3, segregation of PSS as in B1 was not observed, and it is thought that PSS was more uniformly dispersed in the solid electrolyte. Furthermore, in A1 to A3, a high initial capacitance and a low ESR were obtained as described above, and the ratio $I_{p1}/I_{p2}$ was moderate in the Raman spectrum, so it is thought that high conductivity of the solid electrolyte in the first part was ensured. This is thought to be because a relatively high doping rate was obtained in the first part, and the conjugated polymer was formed with high orientation, resulting in high crystallinity.

Although the present invention has been described with regard to the presently preferred embodiments, such disclosure should not be interpreted in a limited way. Various variations and modifications will no doubt become apparent to those skilled in the technical field to which the present invention pertains upon reading the above disclosure. Accordingly, the appended claims should be interpreted to cover all variations and modifications without departing from the true spirit and scope of the present invention.

INDUSTRIAL APPLICABILITY

According to the present disclosure, it is possible to suppress decrease in the capacitance of a solid electrolytic capacitor caused by repeated charge and discharge of the solid electrolytic capacitor. The solid electrolytic capacitor element and the solid electrolytic capacitor of the present disclosure can stably obtain high capacitance even after repeated charge and discharge, and therefore can be used in various applications requiring reliability or long life. However, the applications of the solid electrolytic capacitor element and the solid electrolytic capacitor are not limited to these.

REFERENCE SIGNS LIST

1: solid electrolytic capacitor, 2: capacitor element, 3: resin exterior body, 4: anode lead terminal, 5: cathode lead terminal, 6: anode foil, 7: dielectric layer, 8: cathode part, 9: solid electrolyte layer, 10: cathode extraction layer, 11: first layer (carbon layer), 12: second layer (metal paste layer), 13: separation part, 14: adhesive layer

The invention claimed is:

1. A solid electrolytic capacitor element comprising:

an anode foil that contains aluminum element and includes a porous part at least in a surface layer of the anode foil;

a dielectric layer that covers at least a portion of a surface of the anode foil; and a solid electrolyte that covers at least a portion of the dielectric layer, wherein the solid electrolyte contains sulfur element, and the solid electrolyte has a first part filled in voids in the porous part in the anode foil having the dielectric layer and a second part that protrudes from a main surface of the anode foil having the dielectric layer, the first part contains a first polymer component corresponding to a conjugated polymer and a second polymer component corresponding to a polymer anion containing the sulfur element, the first polymer component contains the sulfur element, the conjugated polymer contains at least a monomer unit corresponding to 3,4-ethylenedioxythiophene, a weight average molecular weight of the polymer anion is 10000 or more, and in elemental mapping of a cross section of the porous part using an electron probe microanalyzer, a presence ratio of the sulfur element is 0.5% or more when a presence ratio of the aluminum element is taken as 100%.

2. The solid electrolytic capacitor element according to claim 1, wherein in a Raman spectrum of the first part, a ratio $I_{p1}/I_{p2}$ of an intensity $I_{p1}$ of a first peak specific to the first polymer component to an intensity $I_{p2}$ of a second peak specific to the second polymer component is 2 or more.

3. The solid electrolytic capacitor element according to claim 2, wherein the ratio $I_{p1}/I_{p2}$ is 7 or less.

4. The solid electrolytic capacitor element according to claim 1, wherein in the first part, the polymer anion contains a monomer unit corresponding to an aromatic sulfonic acid compound, in a Raman spectrum of the first part, a first peak specific to the first polymer component is observed in a range of 1200 $cm^{-1}$ or more and 1600 $cm^{-1}$ or less, and a second peak specific to the second polymer component is observed in a range of 800 $cm^{-1}$ or more and 1100 $cm^{-1}$ or less.

5. The solid electrolytic capacitor element according to claim 1, wherein a weight average molecular weight of the polymer anion is 500,000 or less.

6. A solid electrolytic capacitor comprising at least one solid electrolytic capacitor element according to claim 1.

7. The solid electrolytic capacitor according to claim 6, wherein the solid electrolytic capacitor is a stacked-type capacitor, wherein the at least one solid electrolytic capacitor element is a plurality of the solid electrolytic capacitor elements stacked together.

8. The solid electrolytic capacitor according to claim 6, wherein the solid electrolytic capacitor is a chip-type capacitor.

9. The solid electrolytic capacitor according to claim 6, wherein the solid electrolytic capacitor is a wound-type capacitor.

10. The solid electrolytic capacitor according to claim 9, wherein the at least one solid electrolytic capacitor element comprises two or more wound-type capacitor elements.

11. The solid electrolytic capacitor element according to claim 1, wherein the presence ratio of the sulfur element is 0.65% or more.

12. The solid electrolytic capacitor element according to claim 1, wherein the presence ratio of the sulfur element is 0.7% or more.

13. The solid electrolytic capacitor element according to claim 1, wherein the presence ratio of the sulfur element is 0.78% or more.

14. The solid electrolytic capacitor element according to claim 2, wherein the ratio $I_{p1}/I_{p2}$ is 5.5 or more.

* * * * *